J. McARTHUR.
FILM PACK.
APPLICATION FILED JAN. 6, 1915.
1,198,465.
Patented Sept. 19, 1916.
2 SHEETS—SHEET 1.
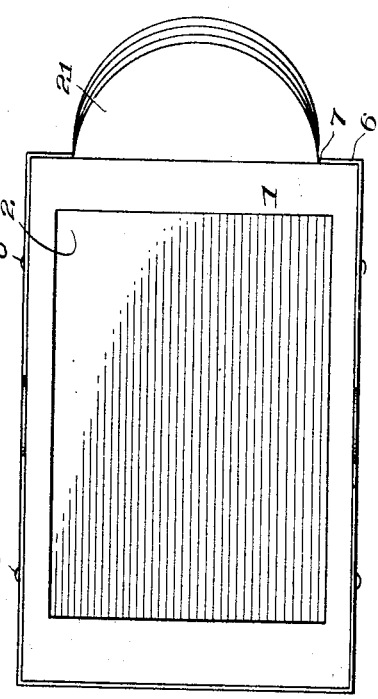
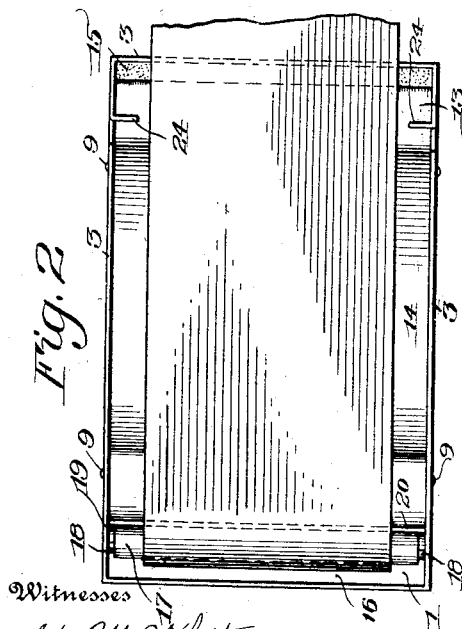
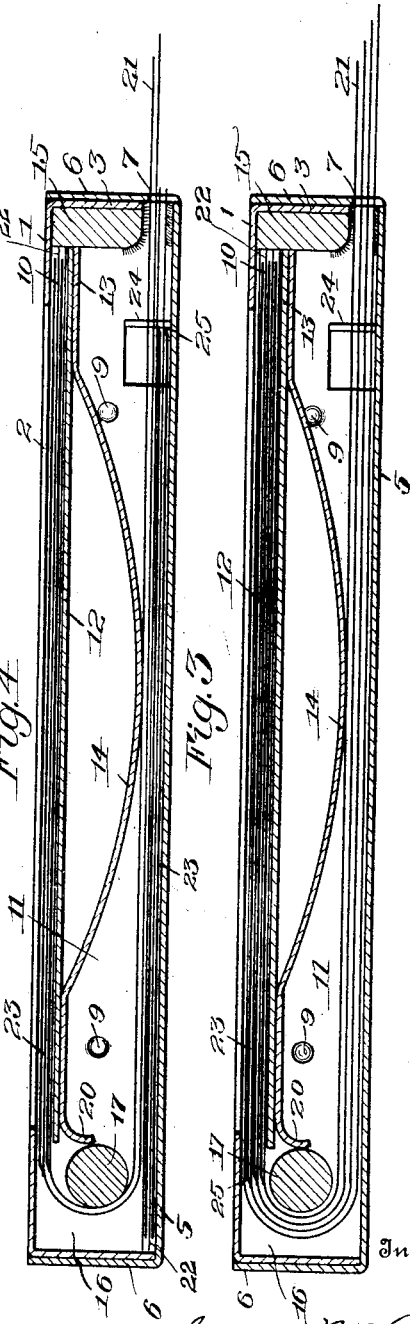
Witnesses
Ada M. Whitmore
Frances Jacubowitz
Inventor
James McArthur
By H. H. Simms
his Attorney

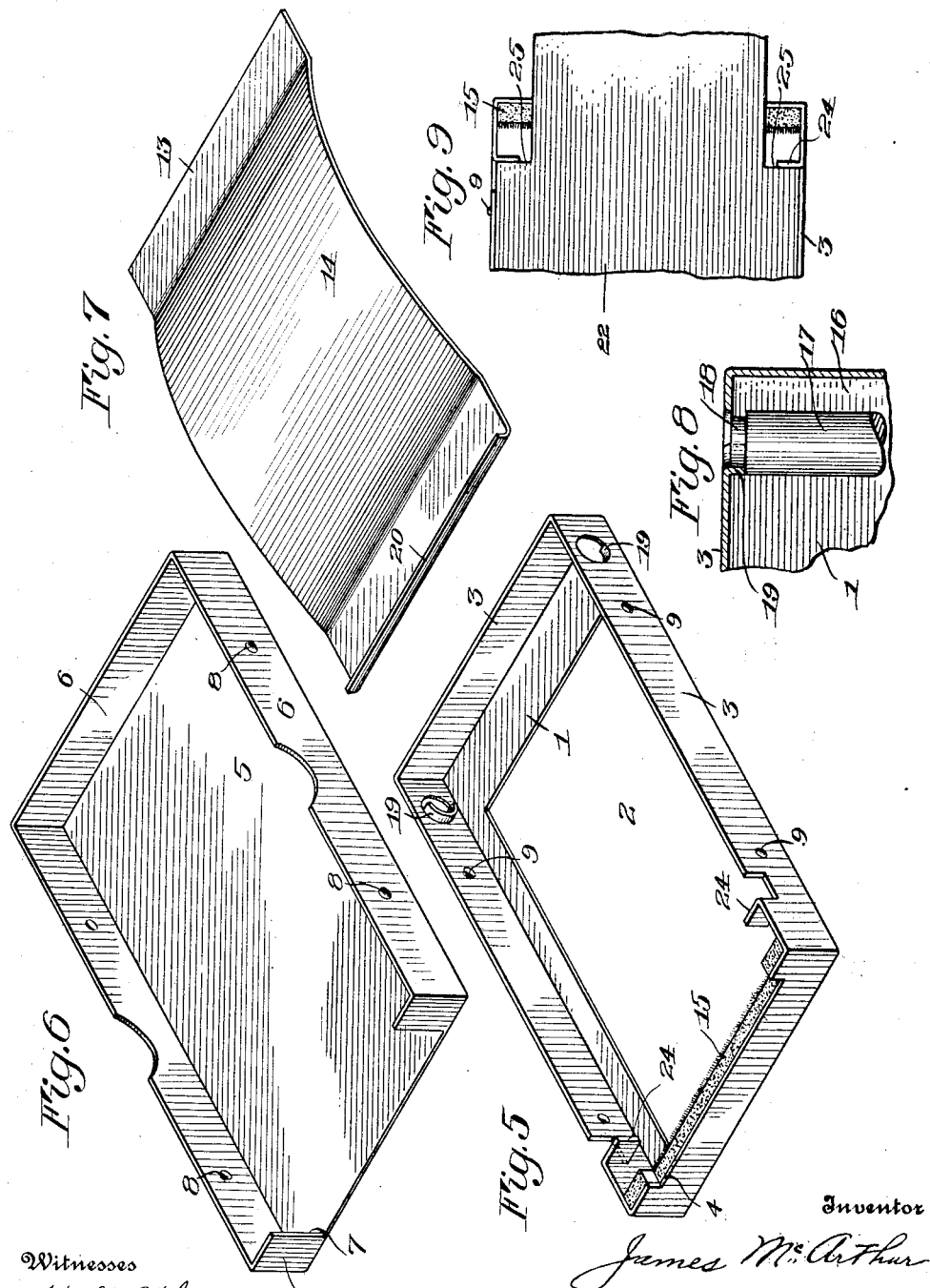

UNITED STATES PATENT OFFICE.

JAMES McARTHUR, OF ROCHESTER, NEW YORK.

FILM-PACK.

1,198,465.  Specification of Letters Patent.  Patented Sept. 19, 1916.

Application filed January 6, 1915. Serial No. 765.

*To all whom it may concern:*

Be it known that I, JAMES MCARTHUR, of Rochester, in the county of Monroe and State of New York, have invented a new and useful Improvement in Film-Packs, which improvement is fully set forth in the following specification and shown in the accompanying drawings.

The present invention relates to film packs of the type in which films are moved from a chamber in which the exposure is made to a dark chamber where they are held until it is desired to develop them, and an object of this invention is to provide a simple and inexpensive construction which will eliminate the interference between the films as they pass from one chamber to the other, this being one of the inconveniences of the devices now on the market.

Another object of the invention is to provide a film pack in which the pressure upon the films in the two chambers is equalized, doing away with the varying pressure in the exposure chamber with the decrease in the number of films in said chamber.

A still further object of the invention is to facilitate the assembling of the film pack, making it unnecessary to fit the films about a partition prior to the introduction of the films into the inclosing casing.

To these and other ends the invention consists in certain parts and combinations of parts all of which will be hereinafter described, the novel features being pointed out in the appended claims.

In the drawings: Figure 1 is a plan view of the side of the film pack provided with the exposure opening; Fig. 2 is a plan view of the pack showing the cover removed and the interior of such pack; Fig. 3 is a vertical section through the pack showing all of the films arranged in the exposure chamber; Fig. 4 is a similar view showing a portion of the films shifted to the dark chamber; Fig. 5 is a perspective view of the flanged casing member; Fig. 6 is a perspective view of the top of the casing; Fig. 7 is a perspective view of the spring member of the movable partition; Fig. 8 is an enlarged detail sectional view showing the connection of the guide roller to the flanged casing member; and Fig. 9 is a detail view showing the engagement of the film with one of the shoulders on the casing.

Referring more particularly to the drawings, 1 indicates one member of the casing which is preferably formed from sheet metal with an exposure opening 2, this member preferably having surrounding flanges 3 and one of the end flanges being cut away at 4 to provide a passageway for the usual pulling tabs or tongues 21 on the backing sheets 22 each of which carries a film 23. The remainder of the casing is formed by a cover member 5 having surrounding flanges 6 within which is received the casing member 1, one of said flanges 6 being cut away at 7 to register with the cut-away portion 4 for the passage of the film pulling tabs or tongues 21. The two casing members may be secured together in any suitable manner but, in this instance, outwardly-pressed portions 8 on the cover member 5 engage over outwardly-pressed portions 9 on the flanges 3 to hold the two members against accidental separation, while permitting their disconnection upon the straining of the walls of the casing members.

One of the features of this invention is a movable partition which is arranged within the casing to form an exposure chamber 10 and a dark chamber 11, this partition being moved to decrease the size of the exposure chamber and increase the size of the dark chamber when the films are moved from the exposure chamber to the dark chamber. Preferably, this partition is resilient so that it exerts an equal pressure upon the films in both chambers notwithstanding the number of films in such chambers. In this instance, this partition is formed of a flat plate 12 providing a plane surface for the films of the exposure chamber, and a spring plate 13 which is bent or curved transversely at 14 and has the convexed side disposed toward the dark chamber, portions of the plate 13 on opposite sides of the curved portions 14 bearing against the plate 12. At one end of the casing, the partition plates 12 and 13 abut the block 15 which is fitted within the casing member 1 adjacent the cut-away portion 4 to exclude light through the cut-away portion. At the other end, the partition is spaced from the casing to provide a space 16 between the exposure chamber and the dark chamber for the passage of the films from the exposure chamber to the dark chamber.

In order to facilitate the passage of the films 23 from the exposure chamber to the dark chamber, a guide is provided at the adjacent end of the movable partition about which the films and their backings are caused to travel. A feature of this guide is that it is secured to the casing and not to the movable partition so that it does not partake of the movements of the movable partition. In this instance, this guide is in the form of a roller 17 having reduced ends 18 fitting in bearings formed on opposite flanges 3 of the casing member 1. Preferably, these bearings are in the form of segmental flanges 19 struck up from the flanges 3 and providing bearings which open laterally toward the adjacent end wall of the casing. The arrangement of the guide on the casing instead of on the partition has the further advantage that it facilitates the assembling of the film pack, the films being first placed in the exposure chamber with their tongues 21 overhanging the flange 3 adjacent the guide. The guide 17 is then inserted in its bearings and the partition plates are then placed in position between the block 15 and the guide roller 17, after which the tongues 21 are folded over the partition plates to rest upon the convex portion 14 and to project through the cut-away portion 4. The cover member 5 is then fitted over the flanged casing member 1 and holds the films in place ready for operation. The spring plate member 13 may have a laterally-turned flange 20 at one end for bearing against the roller 17 in order to prevent said plate being carried above the roller.

As the casing member 1 is formed from sheet metal and as the resilient partition holds the films with a substantially constant pressure against the casing about the exposure opening, it is possible to do away with the light excluding cloth which is usually arranged in the passageway between the exposure chamber and the dark chamber. I have found it especially advantageous to provide the wall opposite the guide roller 17 with a plane and smooth inner surface in order to permit the free travel of the rear ends of the film over such wall. By limiting the movement of the films into the dark chamber, these ends can be caused to lie in close proximity to this smooth and plane end wall and, in this way, project beyond the roller 17 so that such ends will not interfere with the passage of successively moving films into the dark chamber. The engagement with the rear ends of the films in the dark chamber by films successively moving into said chamber has been one of the greatest disadvantages of film packs. In this instance, the stopping of the films in proper position is effected by stop shoulders 24 arranged in the dark chamber and preferably formed by striking lugs up from opposite flanges 3, said lugs or stops being arranged to coöperate with the shoulders 25 on the backings of the films.

The film pack is used in the same manner as those now on the market with any suitable number of films therein and the usual cover sheet. Upon pulling a tab or tongue 21, the film is carried about the roller 17 into the dark chamber until the shoulders 25 engage the stops 24 in the dark chamber when the rear end of the film will be thrown in close proximity to the smooth end wall of the casing so as not to interfere with the passage of the succeeding film. As the film leaves the exposure chamber, the movable partition shifts slightly so that the pressure in the exposure chamber is the same, and, at the same time, the size of the dark chamber increases to accommodate the exposed film. The convexed side of the spring plate facilitates the passage of the film through the dark chamber as it does not offer any material resistance to the movement of such film. The pack is easily assembled as the films are arranged in the casing before the partition is introduced thus dispensing with the labor of fitting the films to the partition.

What I claim as my invention and desire to secure by Letters Patent is:—

1. A film pack comprising a casing, a movable partition arranged therein to provide an exposure chamber and a dark chamber, said partition being spaced from one end of the casing to provide a passageway between the chambers, a guide arranged at said end of the partition and supported by the casing so that the partition moves relatively thereto, films movable from one chamber to the other over the guide and individual backing sheets for the films, each backing sheet lying in the exposure chamber and having a pulling tab extending therefrom about the guide and into and through the dark chamber.

2. A film pack comprising a casing, an insertible and resilient partition movably arranged therein to provide an exposure chamber and a dark chamber, said partition being spaced from one end of the casing to provide a passageway between the chambers, an insertible guide separate from the partition, supported at its ends on the side walls of the casing and arranged within the passageway, films movable over the guide from the exposure chamber to the dark chamber and individual backing sheets for the films, each backing sheet lying in the exposure chamber and having a pulling tab extending therefrom about the guide and into and through the dark chamber.

3. A film pack comprising a casing, a partition arranged therein to provide an exposure chamber and a dark chamber, said partition being spaced from one end of the casing to provide a passageway, bearings opening toward the said end of the casing, a guide roller supported by said bearings in said passageway, films movable over said guide from the exposure chamber to the dark chamber and individual backing sheets for the films, each backing sheet lying in the exposure chamber and having a pulling tab extending therefrom about the guide and into and through the dark chamber.

4. A film pack comprising a casing, a resilient partition movably arranged therein to provide an exposure chamber and a dark chamber, said partition being spaced at one end from the adjacent end of the casing to provide a passageway between the chambers and embodying two plates, one of which is provided with a flat face for coöperating with films in the exposure chamber and the other of which is curved transversely and has its convex face arranged to coöperate with films in the dark chamber, films movable from the exposure chamber to the dark chamber and individual backing sheets for the films, each backing sheet lying in the exposure chamber and having a pulling tab extending therefrom about the guide and into and through the dark chamber.

5. A film pack comprising a casing, a guide supported in the casing in spaced relation with one end wall, a partition arranged in the casing to provide a dark chamber and an exposure chamber, said partition being movable relatively to the guide to increase the size of one chamber and decrease the size of the other chamber, films movable from the exposure chamber to the dark chamber, and individual backing sheets for the films, each backing sheet lying in the exposure chamber and having a pulling tab extending therefrom about the guide into and through the dark chamber.

6. A film pack comprising a casing, a guide supported by the casing in spaced relation to one end wall of the casing, a partition arranged in the casing to provide a dark chamber and an exposure chamber, said partition being movable relatively to the guide to increase the size of one chamber and decrease the size of the other chamber, and being formed of two plates, one of which has a plane face disposed toward the exposure chamber, and the other of which is curved transversely and has a convex face disposed toward the dark chamber.

7. A film pack comprising a casing, a guide secured to the casing in spaced relation to one end wall of the casing, a partition arranged in the casing to provide a dark chamber and an exposure chamber, said partition being movable relatively to the guide to increase the size of one chamber and decrease the size of the other chamber, and being formed of two plates, one of which has a plane face disposed toward the exposure chamber, and the other of which is curved transversely and has a convex face disposed toward the dark chamber, the curved plate having a laterally turned edge engaging the guide.

8. A film pack comprising a casing, a partition arranged in the casing to provide a dark chamber and an exposure chamber and spaced at one end from one end of the casing to provide a passageway between the chambers, a guide roller, and bearings on the casing in said passageway, said guide roller having reduced ends fitted in said bearings, said bearings having lateral openings whereby the roller may be readily removed therefrom.

9. In a film pack, the combination with a casing comprising a flanged sheet metal member having an exposure opening and a cover therefor, of an insertible guide supported at its ends on opposite side flanges of said casing member, an insertible partition separate from the guide to provide a dark chamber and an exposure chamber, films movable from the exposure chamber to the dark chamber over the guide, and individual backing sheets for the films, each backing sheet lying in the exposure chamber and having a pulling tab extending therefrom about the guide and into and through the dark chamber.

10. In a film pack, the combination with a flanged sheet metal casing member provided with an exposure opening and having bearings formed on opposite flanges, and a cover for said casing member, of a guide roller journaled at its ends in said bearings, a partition movably arranged within the flanged member to form an exposure chamber and a dark chamber, and films movable from the exposure chamber to the dark chamber over the guide roller and a separate member coöperating with the flanged casing member to close the latter.

11. In a film pack, the combination with a flanged sheet metal casing member provided with an exposure opening, and a flanged cover for said casing member, of laterally opening bearings struck up from opposite flanges of the casing member, and having lateral openings whereby a guide may be readily removed therefrom, a guide supported in said bearings, a partition arranged in the casing member to form a dark chamber and an exposure chamber, and films movable about said guide from the exposure chamber to the dark chamber.

12. A film pack comprising a casing having one end wall plane and smooth affording an unrestricted surface for the passage of films thereover, a guide arranged in spaced relation to the end wall, a partition in the casing forming an exposure chamber and a dark chamber and movable relatively to the guide, films movable from the exposure chamber to the dark chamber about said guide, and means on the casing for stopping said films as they pass into the dark chamber at such a point that the rear ends of the films project beyond the guide in close proximity to the plane end wall so as not to interfere with the entrance of other films into the dark chamber from the exposure chamber.

13. A film pack comprising a casing formed of two flanged members fitting one within the other, one of said members being provided with an exposure opening and both of said members having coöperating cut away portions at one end through which pulling tabs may extend, a partition separate from said casing members dividing said casing into an exposure chamber and a dark chamber, films arranged in the exposure chamber, and backing sheets for said films lying in the exposure chamber and having tabs extending around one end of the partition, through the dark chamber and projecting from the casing through the opening formed by the cut away portions.

14. A film pack comprising a casing formed of two flanged members fitting one within the other, one of said members being provided with an exposure opening and both of said members having coöperating cut-away portions at one end through which pulling tabs may extend, a removable partition separate from the casing members dividing said casing into an exposure chamber and a dark chamber, said partition being spaced from that end of the casing opposite the cut-away portion to provide a passageway between the chambers, a removable guide separate from the partition arranged in said passageway, films arranged in the exposure chamber and individual backing sheets for the films arranged in the exposure chamber and having tabs extending about the guide through the dark chamber and out through the opening formed by the cut-away portion.

JAMES McARTHUR.

Witnesses:
H. H. SIMMS,
ADA M. WHITMORE.

Copies of this patent may be obtained for five cents each, by addressing the "Commissioner of Patents, Washington, D. C."